United States Patent [19]

Bayer et al.

[11] Patent Number: 5,258,151

[45] Date of Patent: Nov. 2, 1993

[54] MOLDING COMPOSITION FOR THE PRODUCTION OF INORGANIC SINTERED PRODUCTS

[75] Inventors: Michael Bayer, Lützelburg; Iris Nagl, Burgheim, both of Fed. Rep. of Germany

[73] Assignee: Hoechst Aktiengesellschaft, Frankfurt, Fed. Rep. of Germany

[21] Appl. No.: 890,541

[22] Filed: May 28, 1992

[30] Foreign Application Priority Data

Jun. 1, 1991 [DE] Fed. Rep. of Germany ....... 4118011

[51] Int. Cl.$^5$ .............................................. C04B 35/64
[52] U.S. Cl. ..................................... 264/63; 264/109; 264/122; 523/457; 523/465
[58] Field of Search .................. 523/465, 457; 264/63, 264/109, 122

[56] References Cited

U.S. PATENT DOCUMENTS 4,456,713  6/1984  French et al. ....................... 523/455

FOREIGN PATENT DOCUMENTS 3743217  9/1990  Fed. Rep. of Germany .

*Primary Examiner*—John C. Bleutge
*Assistant Examiner*—D. Aylward
*Attorney, Agent, or Firm*—Connolly & Hutz

[57] ABSTRACT

In a ceramic or powder-metallurgical molding composition which contains a wax as the binder, the addition of an epoxy resin leads to an improvement in the dry flexural strength and the workability in the green state of the shaped articles produced therefrom.

8 Claims, No Drawings

MOLDING COMPOSITION FOR THE PRODUCTION OF INORGANIC SINTERED PRODUCTS

The invention relates to a ceramic or powder-metallurgical molding composition for shaped articles which are easily workable in the green state.

The starting substance for dry-pressed ceramic or powder-metal products is usually a fine-grained, poorly flowing powder which is fabricated into ready-to-process granules, for example by spray drying a suspension (=slip) or by another granulation process.

The ceramic or metal primary particles can be bonded into granules of high strength and good flow properties with the aid of ester wax dispersions which form dense films after the aqueous dispersing phase has dried off. On subsequent pressing of the granules in hardened molds, high frictional forces arise, which must be reduced to a minimum by using a lubricant. The frictional forces arising on the mold wall make up the highest proportion here. Compared with other auxiliaries in compression molding, waxes behave differently; relatively high pressed densities can already be achieved under a relatively low pressing pressure. This advantage manifests itself in particular on larger components, production of which requires a high pressing force.

Because of their ability to flow under pressure, ester waxes based on crude montan wax are suitable as so-called "internal" lubricants between the primary particles and as "external" lubricants at the interface with the mold wall. The latter manifests itself in low ejection forces when the green component is removed from the mold. The service life of the pressing mold can thus be prolonged at the same time.

Since the wax content experiences a permanent deformation during the pressing operation, "spring-back" of the pressed component after removal from the mold is low.

A widely used variant of the shaping of blanks, the shape of which cannot be achieved by the above shaping processes, is slip casting. The starting material here is a usually aqueous ceramic or metal powder suspension which is introduced into porous gypsum molds for the removal of water. The result is a more or less solid component, depending on the composition, which can be reinforced with the aid of an organic binder based on wax dispersions for the purpose of transportation or green work-ability. Green strengths of up to 2 N mm$^2$ can thus be achieved, depending on the metered amount. Wax dispersions additionally provide the advantage that—compared with soluble auxiliaries—they have a weakly pronounced tendency to migrate to the gypsum mold during formation of the body and during the subsequent removal of water.

However, it has been found that the green strength is not yet satisfactory in all cases of green compacts produced from ceramic or powder-metallurgical molding compositions with waxes as the sole binder.

A binder and plasticizing agent as a hydrophobizing additive for basic, fireproof compositions and shaped articles based on dolomite is known (cf. DE 37 43 217). This binder consists of a terpenic natural resin product by itself or in combination with a paraffin hydrocarbon, a naturally occurring or synthetic wax, a hydrocarbon resin, a polyethylene, a polyglycol, a polyglycol ether, a polyglycol ester, a wax alcohol, a fatty alcohol, a fatty acid, a polyvinyl ether or a silicone resin. The dolomite composition is bound by a chemical binding agent, such as, for example, a phosphate, silicate, borate, carbonate, sulfate, chromate, citrate, lactate, sulfonate and/or oxalate. However, such binders are not always desirable for ceramic and metallurgical molding compositions since they require additional anions and cations.

It has now been found that a ceramic or powder-metallurgical molding composition which also contains, in addition to a wax, a particular resin as a binder can be easily processed and results in shaped articles which can be easily worked in the green state.

The invention thus relates to a molding composition for the production of inorganic sintered products, consisting of 60 to 99 parts by weight of a ceramic powder or metal powder, 0.1 to 5 parts by weight of a wax having a dropping point of 50° to 100° C., an acid number of 5 to 150, a hydrolysis number of 15 to 160 and a density of 0.95 to 1.20 g/cm$^3$, 0.1 to 5 parts by weight of an epoxy resin having an epoxide equivalent weight of 175 to 4000 and an epoxide value of 0.02 to 0.57 and 0.1 to 5 parts by weight of a curing agent.

The molding composition according to the invention contains non-metallic inorganic or metallic powders as the basis. Examples of such powders are those of $Al_2O_3$, AlN, $Al_2TiO_5$, $B_4C$, WC, SiC and silicates. Suitable metal powders are those of iron, steel, tool steel, tungsten, copper, nickel, aluminum and alloys and intermetallic phases thereof. The powders have a particle size of preferably less than 150 μm.

The molding composition furthermore contains a wax. This wax is a natural wax, a fully or semi-synthetic wax, a polyethylene wax or an amide wax.

The wax is preferably a semi-synthetic wax based on crude montan wax.

The wax has the following characteristic data:

| | |
|---|---|
| Dropping point | 50 to 100° C., preferably 55 to 88° C., |
| Acid number | 5 to 150, preferably 6 to 35, |
| Hydrolysis number | 15 to 160, preferably 15 to 135, |
| Density | 0.95 to 1.20, preferably 1.00 to 1.20 g/cm$^3$. |

The preferred semi-synthetic wax based on crude montan wax is formed by oxidative bleaching of crude montan wax and esterification of the acid wax thus obtained with a $C_2$- to $C_8$-diol. Waxes of this type have been commercially available for many years.

If the molding composition is formed in the aqueous phase, it is advantageous to employ a wax together with an emulsifier, or a wax already containing an emulsifier. If the molding composition according to the invention is formed from a nonaqueous phase, a nonemulsifiable wax is preferred.

The molding composition according to the invention furthermore contains an epoxy resin. This has an epoxide equivalent weight according to DIN 53 188 (EEW) of 175 to 4000, preferably 190 to 850, and an epoxide value of 0.02 to 0.57, preferably of 0.12 to 0.53. To form the binder, the epoxy resin is reacted with a curing agent. The curing agent is either a polyester, an acid anhydride or a polyamine. The epoxy resin, polyester, acid anhydride and polyamine are commercially available and are usually employed for the production of seals and coatings.

Although the resin and curing agent react only slowly with one another at normal temperature, the molding composition according to the invention preferably contains the epoxy resin in microencapsulated form. Only when the shaped articles are produced from the molding composition are the capsules crushed and their contents brought together with the curing agent, so that the resin is cured during the subsequent heat treatment of the green compacts. The resin can be microencapsulated in the manner described below.

For this microencapsulation, the resin is dissolved in a water-immiscible solvent and dispersed in an aqueous gelatin solution. When the dispersion is cooled to less than 15° C., the gelatin gels and envelops the droplets of the resin solution. The gelatin is hardened at a pH above 8 by addition of alkali. The capsules as a rule have a diameter of 1 to 100 μm.

In addition to the wax and the epoxy resin, the molding composition according to the invention can also contain other constituents which facilitate its preparation, for example dispersing agents, foam suppressants, liquefying agents, suspending agents and solvents and others.

The molding composition has the following formulation:

| | |
|---|---|
| Nonmetallic inorganic powder or metal powder | 60 to 99, preferably 80 to 98 parts by weight, |
| Wax | 0.1 to 5, preferably 0.5 to 2 parts by weight, |
| Epoxy resin | 0.1 to 5, preferably 0.5 to 2 parts by weight, |
| Curing agent | 0.1 to 5, preferably 0.5 to 2 parts by weight, |
| Dispersing agent | 0 to 0.5, preferably 0 to 0.3 part by weight, |
| Foam suppressant | 0 to 0.03, preferably 0 to 0.02 part by weight, |
| Liquefying agent | 0 to 0.5, preferably 0 to 0.3 part by weight, |
| Suspending agent and solvent | 0 to 30, preferably 0 to 20 parts by weight. |

To prepare the molding composition according to the invention, the constituents are mixed with one another and if appropriate comminuted very finely. This is preferably effected in the form of a suspension (=slip) in water or an organic solvent. The wax is added as a dispersion or solution. There are several possibilities for the addition of the epoxy resin.

1. A water-insoluble epoxy resin is dissolved in a suitable solvent and microencapsulated in an aqueous gelatin solution, and is then enclosed in microcapsules having an average diameter of 1 to 100 μm. The curing agent for the epoxy resin is a water dispersible polyamine which is in a dispersion together with an emulsifier-containing wax. The microcapsules and the wax dispersion are combined. This dispersion is added to the other constituents of the molding composition.

2. A water-insoluble epoxy resin is microencapsulated together with a water-insoluble curing agent in the presence of the wax and the dispersion is added to the other constituents.

3. A water-dispersible epoxy resin, a water-dispersible curing agent and an emulsifier-containing wax are dispersed together in water and the dispersion is processed further.

The epoxy resin is added before or preferably after any very fine comminution. The finished slip is freed from the suspending agent. If this is effected, as preferred, in a spray drying process, a molding composition in granule form is obtained. Nevertheless, it is also possible to cast the slip directly to shaped articles in absorbent molds, made chiefly of gypsum.

Shaped articles are pressed from the molding composition which is in granule form, and during this operation the microcapsules are destroyed mechanically, so that resin and curing agent are brought together. The reaction between the two substances is accelerated by heating the shaped article to a temperature of up to 200° C. over a period of 0.1 to 1 hour. The epoxy resin then forms a strengthening binder together with the wax. In the case of aqueous molding compositions combining water which are extruded, heat treatment to activate the binder can also be effected by generating heat inside the shaped article by microwaves.

The dry flexural strength achieved with the molding composition according to the invention is about 19 N/mm$^2$. It can already be achieved after a heat treatment time of less than one hour.

By separating the reactive binder constituents by microencapsulation of one of them, the molding composition according to the invention acquires a very good storage stability. The green strength of the shaped articles produced therefrom can be adjusted to suit the requirements. The shaped articles can be sintered to form inorganic sintered products.

The examples which follow are intended to illustrate the invention.

EXAMPLE 1

80 parts by weight of Al$_2$O$_3$ powder, 2 parts by weight of emulsifier-containing ester wax based on crude montan wax (dropping point 80° C., acid number 30, hydrolysis number 100, density 1.01), 8 parts by weight of capsules containing a 40% strength solution of an epoxy resin (EEW 750 to 830, epoxide value 0.12 to 0.133) in n-butyl acetate, 3 parts by weight of polyamine (aliphatic, H$_{active}$ equivalent weight 160), 20 parts by weight of water and 0.1 part by weight of polyacrylate (ammonium polyacrylate, pH 7) were processed to a slip.

For this operation, the wax was first dispersed in the water, which had been heated to 95° C. The dispersion was cooled to room temperature and the polyamine was dissolved therein. The capsules were then distributed homogeneously in the dispersion by stirring. After addition of the polyacrylate, which served as a dispersing auxiliary, the Al$_2$O$_3$ powder was stirred in. The resulting slip was converted into a molding composition in granule form by spray drying.

Test specimens produced from this molding composition had—without heat treatment—a dry flexural strength according to DIN 51 030 of 2 to 8 N/mm$^2$.

EXAMPLE 2

0.4 part by weight of ester wax based on crude montan wax (dropping point 60° C., acid number 4, hydrolysis number 10, density 1.20) was dissolved in 5 parts by weight of ethanol which had been heated to 40° C. At the same time, 0.4 part by weight of epoxy resin (EEW 750 to 830, epoxide value 0.12 to 0.133) and 0.4 part by weight of phthalic anhydride were dissolved in 15 parts by weight of n-butyl acetate. The two solutions were combined at 20° C. 80 parts by weight of carbonyl-iron powder were stirred into this combined solution and the resulting slip was converted into a molding composition in granule form by spray drying.

Test specimens were pressed from this molding composition and heat treated at 150° C. for 20 minutes. The dry flexural strength was about 19 N/mm².

EXAMPLE 3

2 parts by weight of emulsifier-containing ester wax based on crude montan wax (dropping point 80° C., acid number 30, hydrolysis number 100, density 1.01) were dispersed in 20 parts by weight of water at 90° C., while stirring. 2 parts by weight of epoxy resin (EEW 190 to 200, epoxide value 0.50 to 0.53) and 2 parts by weight of polyamine (aliphatic, $H_{active}$ equivalent 160) were stirred into this dispersion at 20° C. 40 parts by weight of $Al_2O_3$ powder were then added. After addition of 0.1 part by weight of polyacrylate (ammonium polyacrylate, pH 7), a further 40 parts by weight of $Al_2O_3$ powder were incorporated. The resulting slip was introduced into gypsum molds and the water was removed. The green compacts thus obtained were then consolidated by heat treatment at 100° C. for 10 minutes. The green compacts had a dry flexural strength of about 7 N/mm² and could be machined well.

EXAMPLE 4

4 parts by weight of capsules containing 0.8 part by weight of epoxy resin (EEW 750 to 830, epoxide value 0.12 to 0.133) and 0.8 part by weight of phthalic anhydride in 2.4 parts by weight of n-butyl acetate were distributed at 20° C. in a dispersion prepared at 90° C. from 4 parts by weight of emulsifier-containing ester wax based on crude montan wax (dropping point 80° C., acid number 30, hydrolysis number 100, density 1.01) and 20 parts by weight of water. 80 parts by weight of $Al_2O_3$ powder were then added while stirring, and the slip formed was converted into a molding composition in granule form by spray drying.

Test specimens of this molding composition had a dry flexural strength of 2 to 7 N/mm² after heat treatment at 150° C. for 30 minutes, and could be machined well.

EXAMPLE 5

1 part by weight of emulsifier containing ester wax based on crude montan wax (dropping point 80° C., acid number 30, hydrolysis number 100, density 1.01) was dispersed in 10 parts by weight of water at 90° C. and this dispersion was kneaded with 90 parts by weight of $Al_2O_3$ powder, 1 part by weight of epoxy resin (EEW 190 to 200, epoxide value 0.50 to 0.53), 1 part by weight of polyamine (aliphatic, $H_{active}$ equivalent weight 160) and 1 part by weight of hydroxyethylcellulose (type 100000, as a viscosity regulator) to form a plastic composition. The composition was extruded to form test specimens which were heated to 90° C. by hot air or the action of microwaves. They had a dry flexural strength of 8 N/mm² and could be machined well.

We claim:

1. A molding composition for the production of inorganic sintered products, comprising
   60 to 99 parts by weight of a ceramic powder or metal powder,
   0.1 to 5 parts by weight of a wax having a dropping point of 50° to 100° C., an acid number of 5 to 150, a hydrolysis number of 15 to 160 and a density of 0.95 to 1.20 g/cm³,
   0.1 to 5 parts by weight of an epoxy resin having an epoxide equivalent weight of 175 to 4000 and an epoxide value of 0.02 to 0.57 and
   0.1 to 5 parts by weight of a curing agent, wherein the molding composition contains the epoxy resin in the form of microcapsules.

2. A molding composition as claimed in claim 1, which additionally contains at least one substance selected from the group consisting of dispersing agents, foam suppressants, liquefying agents, suspending agents and solvents.

3. A molding composition as claimed in claim 1, wherein the wax is an emulsifier-containing ester wax based on crude montan wax.

4. A method of producing a shaped component, comprising:
   shaping the molding composition of claim 1.

5. A method as claimed in claim 4, wherein the molding composition is shaped under pressure.

6. A method as claimed in claim 4, wherein the molding composition is shaped under heat and pressure, the heat being sufficient to activate the epoxy resin and curing agent and ranging up to 200° C.

7. A method of producing a shaped component, comprising:
   shaping the molding composition of claim 1 under a pressure sufficient to provide mechanical destruction of the microcapsules, so that the epoxy resin and the curing agent are brought together.

8. A method for producing an inorganic sintered product, comprising: sintering a shaped component which has been produced by the method of claim 4.

* * * * *